(12) United States Patent
Saiu et al.

(10) Patent No.: US 9,911,089 B2
(45) Date of Patent: Mar. 6, 2018

(54) EMAIL CLIENT WITH ERP TASK INTEGRATION

(75) Inventors: Joanne Saiu, San Jose, CA (US); Radhakrishnan Pallath, Alpharetta, GA (US); Dan Fieldhouse, Saint John, IN (US); Shawn Abernathy, Boulder Creek, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 58 days.

(21) Appl. No.: 13/234,389

(22) Filed: Sep. 16, 2011

(65) Prior Publication Data
US 2013/0073634 A1 Mar. 21, 2013

(51) Int. Cl.
G06F 15/16 (2006.01)
G06Q 10/06 (2012.01)
G06Q 10/10 (2012.01)

(52) U.S. Cl.
CPC ......... *G06Q 10/0631* (2013.01); *G06Q 10/06* (2013.01); *G06Q 10/107* (2013.01)

(58) Field of Classification Search
CPC .......... H04L 29/08072; H04L 47/2441; G06Q 10/107; G06Q 10/10; G06Q 10/1093; G06Q 10/109; G06Q 10/06314; G06Q 10/0631; G06Q 10/06; G06Q 10/06311; G06Q 10/0633; G06Q 10/063114; G06F 9/4843; G06F 15/0266
USPC ................... 709/203, 206, 204, 223; 707/1; 718/100; 379/265.11; 705/8, 9, 7.24, 705/7.15, 7.27; 715/751
See application file for complete search history.

(56) References Cited

U.S. PATENT DOCUMENTS

| | | | |
|---|---|---|---|
| 7,774,408 B2 * | 8/2010 | Sinha et al. | 709/206 |
| 8,407,078 B1 * | 3/2013 | Caputo | G06Q 10/06 705/7.27 |
| 8,751,590 B2 * | 6/2014 | Noble | G06Q 10/0631 709/204 |
| 8,875,029 B1 | 10/2014 | Naidu | |
| 9,129,267 B2 | 9/2015 | Khorsheed et al. | |
| 9,356,790 B2 | 5/2016 | Sambetti et al. | |
| 2004/0006593 A1* | 1/2004 | Vogler et al. | 709/203 |
| 2004/0143472 A1* | 7/2004 | Estrada et al. | 705/8 |

(Continued)

OTHER PUBLICATIONS

Microsoft Corporation, "View and create tasks on a SharePoint site by using Outlook," Jun. 2010, p. 1.*

(Continued)

*Primary Examiner* — Anthony Mejia
*Assistant Examiner* — Schquita Goodwin
(74) *Attorney, Agent, or Firm* — Kilpatrick Townsend & Stockton LLP

(57) ABSTRACT

Various arrangements for handling enterprise resource planning (ERP) tasks external from ERP software are presented. An email client, executed on a user computer system, may retrieve ERP tasks that are assigned to a user from an ERP computer system. The email client executed on the user computer system may integrate the ERP tasks retrieved from the ERP computer system into an email client task list such that the email client task list displays the ERP tasks assigned to the user. The email client executed on the user computer system may display the email client task list that comprises the ERP tasks retrieved from the ERP computer system.

18 Claims, 10 Drawing Sheets

(56) References Cited

U.S. PATENT DOCUMENTS

| | | | |
|---|---|---|---|
| 2006/0069605 A1* | 3/2006 | Hatoun | G06Q 10/06 705/7.15 |
| 2006/0143613 A1* | 6/2006 | Lippe et al. | 718/100 |
| 2006/0167829 A1* | 7/2006 | Dreyfus et al. | 707/1 |
| 2007/0016646 A1* | 1/2007 | Tendjoukian et al. | 709/206 |
| 2008/0016580 A1* | 1/2008 | Dixit | G06F 21/604 726/27 |
| 2008/0043988 A1* | 2/2008 | Galvin | 379/265.11 |
| 2008/0177848 A1* | 7/2008 | Wakhlu | G06Q 10/107 709/206 |
| 2009/0299810 A1* | 12/2009 | Jardine et al. | 705/9 |
| 2010/0305997 A1* | 12/2010 | Ananian | G06F 9/5038 705/7.27 |
| 2011/0125545 A1* | 5/2011 | Lehmann et al. | 705/7.24 |
| 2011/0126123 A1* | 5/2011 | Reter | G06Q 10/109 715/751 |
| 2011/0154338 A1* | 6/2011 | Ramanathaiah | G06Q 10/06 718/100 |
| 2012/0054636 A1* | 3/2012 | Robertson-Hodder | G06F 17/30011 715/748 |
| 2012/0198017 A1* | 8/2012 | LeVasseur | H04L 51/24 709/206 |
| 2013/0007139 A1* | 1/2013 | Bombacino | G06Q 10/107 709/206 |

OTHER PUBLICATIONS

Michael Antonovich, "Office and SharePoint 2007 User's Guide: Integrating SharePoint with Excel, Outlook, Access, and Word," Feb. 1, 2009, Apress, Section Title: Synchronizing Tasks Between SharePoint and Outlook, p. 185.*

James Pyles, "SharePoint 2007: The Definitive Guide," Sep. 24, 2007, O'Reilly Media Inc., Chapter Title: Outlook Web Access.*

"Microsoft SharePoint 2007 for Dummies," Apr. 9, 2007, John Wiley & Sons, p. 208.*

* cited by examiner

| Favorites | Main Menu ▸ | ▸ Services Procurement | ▸ Manage Services Work Orders |

Task Checklist

View Task Detail

Work Order ID: DMO0000054001  Business Unit: US001
Work Order Type: Extension  Work Order Status: Open

Task Details

Task: Order Laptop
Group Name: IT
Description: Information Technology
Execution Type: Mandatory
Approval Type: Pre-Approval
Task Status: Not Started ▾
Default Assigned To: Invoice Approver ▾
Assigned To: CARRIECONYERS  Carrie Conyers
Email: peoplesoft@peoplesoft.com ▸ Comments All Comments: 
Add Comments:

Find | View All   First ◀ 1 of 2 ▶ Last

FIG. 3

| Tasks | | | |
|---|---|---|---|
| | Subject | | Due Date |
| | Click here to add a new Task | | |
| | Take New Employee out for lunch | | Mon 7/4/2011 |
| | Order Laptop – Information Technology – Mandatory (ERP) | | None |
| | 430 | | |

Favorites | Main Menu > Services Procurement > Manage Services Work Orders

Service Work Order
View Task Checklist

Work Order ID: DMO00000054001     Business Unit: US001
Work Order Type: Extension     Work Order Status: Open This List is used to keep track of Procurement related tasks that have been manually completed.

Task Details

Customize

| Task Description | Group Name | Assigned-To | Task Status | Approval Type | Expected Task Completion Date | Notify | Notify Date | Deleted in Outlook ® | Execution Complete |
|---|---|---|---|---|---|---|---|---|---|
| Order Laptop | IT | Carrie Conyers | Not Started ▾ | Pre-Approval | 06/05/2006 | ☐ | | ☐ | ☐ |
| Assign Badge | ADMIN | Yolanda Sanchez | Not Started ▾ <br> Completed <br> Deferred <br> In Progress <br> Not Started <br> Waiting on someone else | Pre-Approval | 06/05/2006 | ☑ | 06/05/2006 | ☐ | ☐ |

510
520

Detail

☐ Execute All Eligible Task

[ Save ]   Managemeng Services Work Orders

500

EMAIL CLIENT WITH ERP TASK INTEGRATION

BACKGROUND

Enterprise management software, such as Enterprise Resource Planning (ERP) software, often requires one or more tasks to be performed by a specific user. Once the user has performed the task, the user may be required to indicate within the ERP software that the tasks delegated to the user have been completed. Following this user indicating a task as completed, one or more related tasks may be assigned to a different user. As such, a significant number of users may be required to log in to the ERP software to indicate that tasks have been completed. Such an arrangement may be time-consuming, may be inefficient, and/or may result in an increased security risk by requiring a larger number of users to log in and access the ERP software.

SUMMARY

Various systems, methods, and computer program products are described for handling enterprise resource planning (ERP) tasks external from ERP software. In some embodiments, a system for handling enterprise resource planning (ERP) tasks external from ERP software is presented. The system may include an ERP computer system. The ERP computer system is configured to execute the ERP software. The ERP computer system may also be configured to store ERP tasks, each ERP task being assigned to one or more users of a plurality of users. The system may include a user computer system configured to execute an email client for a user of the plurality of users. The email client may be configured to retrieve ERP tasks from the ERP computer system that are assigned to the user. The email client may be configured to integrate the ERP tasks retrieved from the ERP computer system into an email client task list such that the email client task list displays the ERP tasks assigned to the user. The email client may be configured to cause the email client task list to be displayed.

Embodiments of such a system may include one or more of the following: The email client may be further configured to receive a modification to an ERP task of the ERP tasks. The email client may be further configured to cause the modification to the ERP task to be transmitted to the ERP computer system. The email client may be further configured to modify the ERP task based on the modification received from the email client. Modifying the ERP task may comprise designating the ERP task as completed. The email client may be further configured to cause one or more email client tasks to be stored, wherein each of the one or more email client tasks is accessible via the email client but not the ERP computer system. The email client may be further configured to cause the email client task list to be displayed such that the one or more email client tasks are presented concurrently with the ERP tasks assigned to the user. The ERP software may be further configured to require login credentials from each user of the plurality of users to permit access to the ERP computer system. The email client may be further configured to cause the login credentials of the user to be transmitted to the ERP computer system prior to retrieving ERP tasks from the ERP computer system that are assigned to the user. Each ERP task may be a user-performed activity required to be completed by a point in time.

In some embodiments, a method for handling enterprise resource planning tasks external from ERP software is presented. The method may include retrieving, by an email client executed on a user computer system, an ERP task from an ERP computer system that is assigned to a user. The ERP computer system may execute the ERP software. The ERP computer system may store the ERP task assigned to the user. The method may include integrating, by the email client executed on the user computer system, the ERP task retrieved from the ERP computer system into an email client task list such that the email client task list displays the ERP task assigned to the user. The method may include causing, by the email client executed on the user computer system, the email client task list that comprises the ERP tasks retrieved from the ERP computer system to be displayed.

In some embodiments, a computer program product residing on a non-transitory processor-readable medium and comprising processor-readable instructions is presented. The instructions may be configured to cause a processor to retrieve an ERP task from an ERP computer system that is assigned to a user. The instructions may be configured to cause a processor to the ERP computer system to execute ERP software. The ERP computer system may store the ERP tasks assigned to the user. The instructions may be configured to cause a processor to integrate the ERP task retrieved from the ERP computer system into an email client task list of an email client such that the email client task list displays the ERP tasks assigned to the user. The instructions may be configured to cause a processor to cause the email client task list that comprises the ERP task retrieved from the ERP computer system to be displayed.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates an embodiment of an interface displaying a task within ERP software.

FIG. 4 illustrates an embodiment of an interface of an email client task list having an integrated ERP task.

FIG. 5 illustrates another embodiment of an interface displaying a task within ERP software.

DETAILED DESCRIPTION

Figure 1:
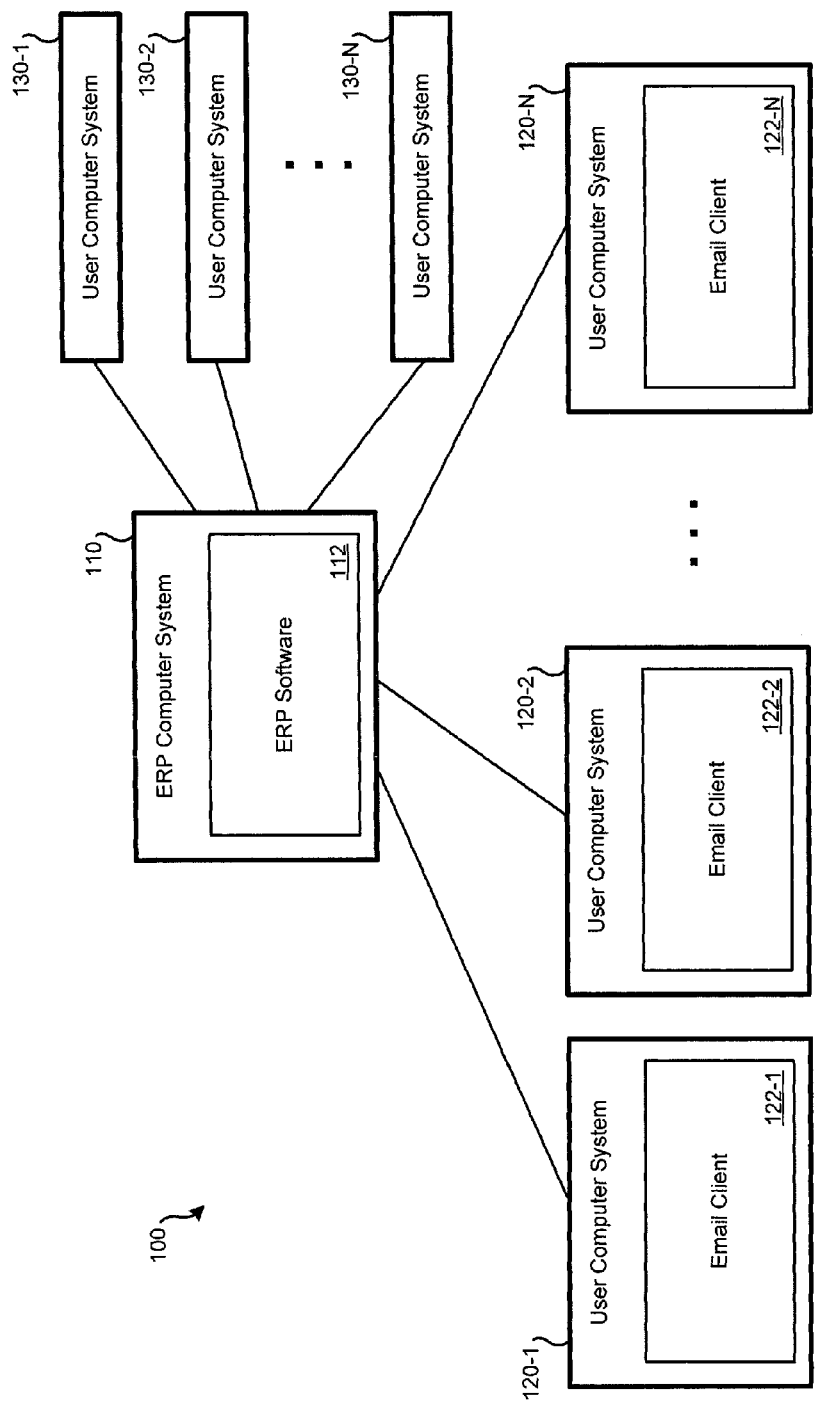
FIG. 1 illustrates an embodiment of a system for handling enterprise resource planning (ERP) tasks external from ERP software.

Enterprise Resource Planning (ERP) software, such as ORACLE's PEOPLESOFT SERVICE PROCUREMENT, may be used to manage various tasks. Different users may be responsible for completing different tasks. A task may be defined as an activity to be performed by a user, which may be required to be completed by a particular time and/or date or within a particular period of time. In a conventional arrangement, once a task has been completed by a user, the user may be required to log in to the ERP software and indicate therein that the task assigned to the user has been completed. Following the task being indicated as complete, one or more additional tasks may be assigned by the ERP software to the same user or a different user.

When a user is required to log in to ERP software to indicate that a task is completed, this may be the only function or one of only a few functions that the user performs when logged into ERP software. As such, the user may need to log in to the ERP software for the sole purpose of indicating that a task assigned to the user has been completed. Rather than requiring the user to log in to the ERP software to only indicate that a task has been completed, the user may be provided with an interface external to the ERP software that allows the user to indicate that the task has been completed. This external interface may then be synchronized with the ERP software such that both interfaces reflect the appropriate state of the tasks assigned to the user.

For users that log in to ERP software for a limited number of reasons, such as only for indicating that a task has been completed, an interface that does not require the user to log in to the ERP software may be efficient. An interface provided via an email client, such as MICROSOFT OUTLOOK, may allow for tasks to be designated as completed via an interface that is frequently used by the user. Allowing a user to designate an ERP task as completed via such a frequently used interface may result in the user being more timely in providing such designations and/or in responding to new tasks. Further, by requiring the user to directly log in to the ERP software less often, the security of the ERP software may be increased.

For a user to indicate that a task has been completed via an email client, such as MICROSOFT OUTLOOK, the ERP tasks requiring completion by the user may be integrated into the email client's task list. The user's email client may periodically contact the ERP software and synchronize tasks that are linked with the user. These ERP tasks may be presented to the user via a task list within the email client. The ERP tasks that require completion by the user may be displayed concurrently with tasks originating outside of the ERP software in the email client's task list. When a user indicates that an ERP task has been completed, the email client may send, such as via a plug-in, an indication to the ERP software to indicate that the task is to be designated as completed. As such, by the user interacting with only the email client, the user can view ERP tasks and designate such ERP tasks as completed in the ERP software.

FIG. 1 illustrates an embodiment of a system 100 for handling enterprise resource planning (ERP) tasks external from ERP software. System 100 includes: ERP computer system 110, user computer systems 120, and user computer systems 130. ERP computer system 110, which may include one or more computers (e.g., servers), may be a host computer system that executes ERP software 112. ERP software 112 may be a variety of types of enterprise software that requires tasks to be completed by various users. For example, ERP software 112 may be ORACLE's PEOPLESOFT SERVICE PROCUREMENT software. This ERP software may be accessed by multiple users at the same time, either locally or remotely.

A task may be defined as an activity to be performed by a user, which may be required to be completed by a particular time and/or date or within a particular period of time. The task may require the user to perform various actions offline (e.g., physically perform some action) and/or use software other than the ERP software to complete the task. As such, the task may only be used to keep track of whether some activity that is assigned to the user has been completed or not; the task itself may be performed via some other arrangement.

One or more user computer systems 130 may be in communication with ERP computer system 110. User computer systems 130 may include desktop computers, laptop computers, tablet computers, and/or mobile communication devices. In system 100, three user computer systems 130 are illustrated: 130-1, 130-2, and 130-N; it should be understood that one, two, four, or more user computer systems may be in communication with ERP computer system 110 in other embodiments. Users using a user computer system of user computer systems 130 (such as user computer system 130-1) may log in to ERP software 112 from user computer system 130-1. As such, the user, via user computer system 130-1, may interact with ERP software 112. If the user desires to modify an ERP task (e.g., indicate the ERP task is completed, reassign the ERP task, etc.) assigned to the user with ERP software 112, the user may log in to ERP software 112 from user computer system 130-1 and modify the ERP task and/or perform other functions.

User computer systems 120 represent user computer systems where a user can modify tasks via an email client, such as MICROSOFT's OUTLOOK. User computer systems 120 may include desktop computers, laptop computers, tablet computers, and/or mobile communication devices. In system 100, three user computer systems 120 are illustrated: 120-1, 120-2, and 120-N; it should be understood that one, two, four, or more user computers may be in communication with ERP computer system 110 in other embodiments. Each of user computer systems 120 has an email client. Email clients 122 may each have a plug-in installed that controls communication between the email client of the corresponding user computer system and ERP software 112 executing on the ERP computer system 110. For example, email client 122-1 may have a plug-in installed that synchronizes tasks assigned to the user of user computer system 120-1 with ERP software 112 executing ERP computer system 110. As an example, the plug-in may be ORACLE's PEOPLESOFT plug-in for MICROSOFT's OUTLOOK email client. It should be understood that when an email client is referred to as performing an ERP task-related function, the email client may be functioning in conjunction with an ERP plug-in installed with the email client. When the user modifies an ERP task presented via email client 122-1, email client 122-1 may synchronize with ERP software 112, such that, if the user has indicated the ERP task as complete in email client 122-1, the ERP task will be similarly indicated as completed in ERP software 112. As such, if the user indicates a task as completed in email client 122-1, the user may not need to log directly into ERP software 112 to indicate the task as completed. Besides interacting with tasks of ERP software 112 via email clients 122, users of user computer systems 120 may interact with ERP software 112 by directly logging in, similar to users of user computer systems 130. In some embodiments, users that interact with ERP software 112 via an email client of email clients 122 may be prohibited from logging directly into ERP software 112.

While the illustrated embodiment of system 100 illustrates user computer systems 120 executing email clients that are used to view and modify ERP tasks of ERP software 112, it should be understood that forms of software other than an email client may be used to display tasks and receive modifications from a user at user computer systems.

Figure 2:
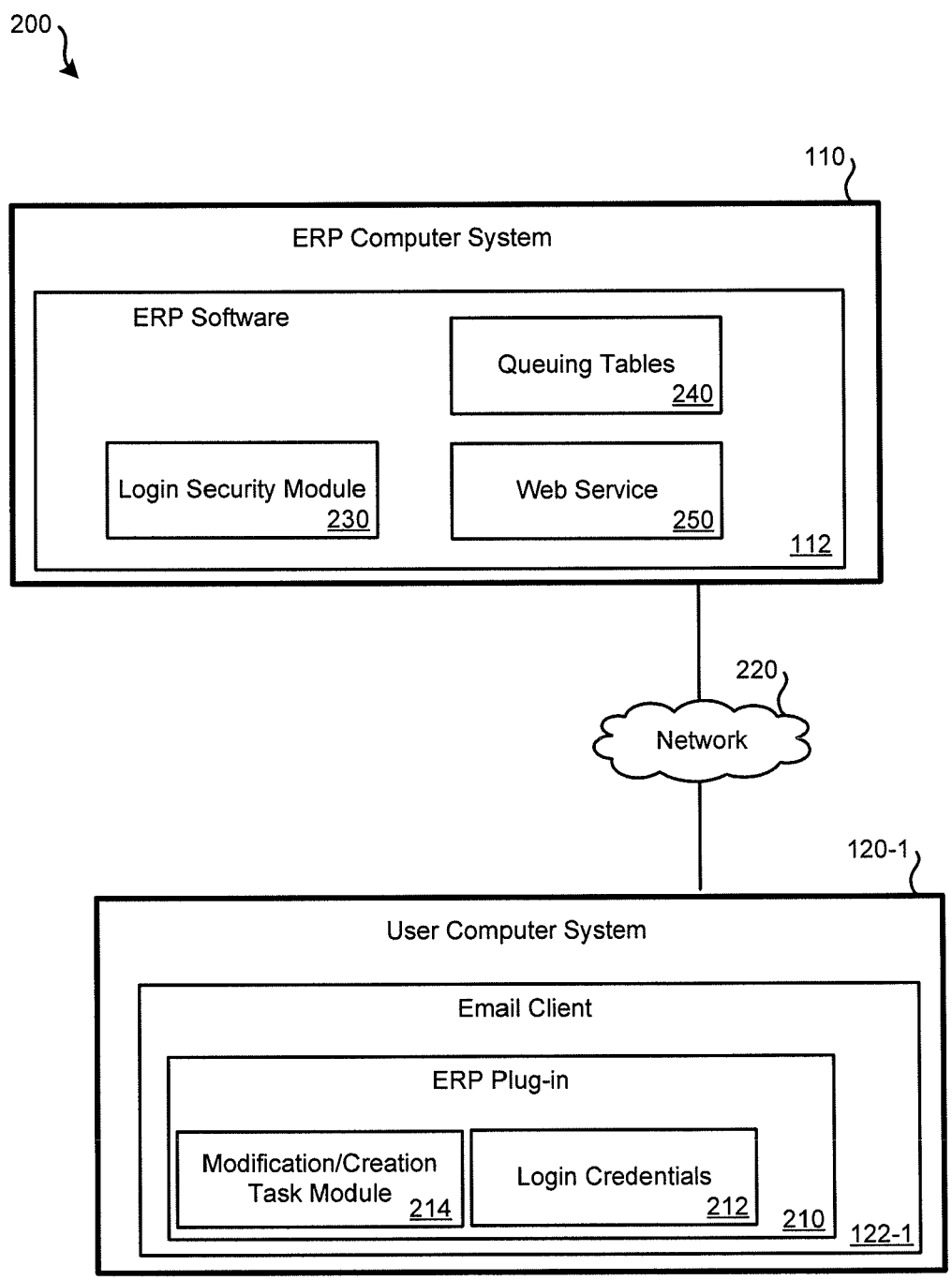
FIG. 2 illustrates another embodiment of a system for handling ERP tasks external from ERP software.

FIG. 2 illustrates another embodiment of a system 200 for handling ERP tasks external from ERP software. System 200 may represent ERP computer system 110 communicating with user computer system 120-1 of FIG. 1. Only communication between ERP computer system 110 and user computer system 120-1 is shown for simplicity. It should be understood that ERP computer system 110 may be communicating with other user computer systems. System 200 may represent at least some embodiments of system 100.

In system 200, ERP computer system executes ERP software 112. ERP software 112 comprises login security module 230. Login security module 230 may require that a user interacting with ERP software 112 be authenticated before being permitted access to ERP software 112. Login security module 230 may require a user to provide a username and password. Other forms of security may also be possible via login security module 230, such as biometric security. Login security module 230 may require authentication of the user regardless of whether the user is accessing ERP software 112 directly (such as via a computer system of user computer systems 130) or via an email client (such as email client 122-1 of user computer system 120-1). If login security module 230 is unable to authenticate the user, the user may be prohibited from accessing ERP software 112.

ERP software 112 may include one or more queuing tables 240. Queuing tables 240 may store tasks assigned to users. As such, as new tasks are created, ERP software 112 may load the ERP task and an indication of the responsible user into queuing tables 240. When a user completes (or otherwise modifies) an ERP task, queuing tables 240 may be modified to reflect the completion (or other modification) of the ERP task. Queuing tables 240 may be accessible to one or more user computer systems via web service 250. Web service 250 may receive and process requests from email client 122-1 of user computer system 120-1. Web service 250 may serve as an interface between queuing tables 240, ERP software 112 of ERP computer system 110, and email client 122-1 of user computer system 120-1.

Communication between ERP computer system 110 and user computer system 120-1 may occur via network 220. Network 220 may represent one or more public and/or private networks. For example, network 220 may include the Internet and/or a corporate intranet.

Email client 122-1 may be executed in conjunction with ERP plug-in 210. ERP plug-in 210 may be a software component that customizes the functionality of email client 122-1 by enabling communication between email client 122-1 and web service 250 (which, in turn, may manage communication with ERP software 112). ERP plug-in 210 may also enable communication between email client 122-1 and other forms of ERP software.

ERP plug-in 210 may comprise a login credentials module 212. Login credentials module 212 may store login credentials of the user of email client 122-1 for ERP software 112. When ERP plug-in 210 communicates with web service 250, the user's login credentials may be supplied to web service 250. These credentials may be verified by login security module 230. If the user's credentials are authenticated by login security module 230, the user may be permitted access to tasks assigned to the user. Following authentication, tasks assigned to the user may be retrieved by ERP plug-in 210 from queuing tables 240. The retrieved ERP tasks may be integrated into a task list present in email client 122-1. This email client task list may also include tasks that are locally created and/or retrieved from some other remote computer system. As such, the email client task list may include ERP tasks, locally-created tasks, and/or tasks retrieved from some other software or remote computer system.

Modification/Creation Task Module 214 may permit the user of email client 122-1 to modify and/or create an ERP task via email client 122-1. Creating a task may include the user defining an ERP task and a user that is assigned to completing the task. The task may be transmitted to web service 250, which may load the ERP task in ERP software 112. Modifying an ERP task may include changing attributes of an ERP task (such as reassigning the user responsible for completing the task), deleting an ERP task, designating an ERP task completed, etc. Modifying an ERP task via modification/creation task module 214 may involve a user manipulating the ERP task via a task list of email client 122-1. For example, in email client 122-1, if a user checks an ERP task as completed, modification/creation task module 214 may send an indication to ERP software 112 of the task being completed. As such, the ERP task, as stored by queuing tables 240, may be updated such that the ERP task is synchronized as presented in email client 122-1 and ERP software 112. Similarly, if the user directly logs into ERP software 112 and indicates an ERP task as completed (or otherwise modified), the task list of the user's email client may be updated to reflect the change.

FIG. 3 illustrates an embodiment of an interface 300 displaying a task within ERP software. Interface 300 displays an ERP task that is assigned to a user. Interface 300 may be presented to a user via a user computer system of user computer systems 130 or a user computer system of user computer systems 120 when a user directly logs in to ERP computer system 110 to interact with ERP software 112.

Task indicator 310 may identify the purpose of the ERP task. In the illustrated embodiment of interface 300, task indicator 310 indicates "Order Laptop." As such, the user associated with this task may be responsible for ordering a laptop computer.

Task status indicator 320 indicates the current status of the task. The user may have the ability to select from various statuses. In the illustrated embodiment of interface 300, task status indicator 320 is set to "Not Started." This may indicate that the user associated with this ERP task has not begun to complete the ERP task. Other statuses may include: in-progress, completed, reassigned, etc.

"Assigned to" indicator 330 may indicate the identity of the user that the ERP task is assigned to. In the illustrated embodiment of interface 300, the ERP task is assigned to user "CarrieConyers." As such, user CarrieConyers may be responsible for completing the ERP task of ordering a laptop.

"Work order ID" indicator 340 may be an identification assigned to a particular work order. A work order may have a defined set of tasks that may need to be completed in a particular order by one or more users. A work order may have a group of two or more tasks. As an example of this, consider actions that need to be completed when a company hires a new employee. A "New Employee" work order may include a list of various tasks that need to be completed by various users whenever a new employee is hired. For example, the "New Employee" work order may include tasks such as: clean cubicle, get security clearance, set-up telephone extension, provide company shirt, provide initial training, have employment agreement signed, and order a laptop computer. Each of these tasks may be assigned to a user required to complete them. Some of these tasks may be required to be performed in a particular order. For example, providing initial training may be required before the employment agreement can be signed. As such, the task for having the employment agreement signed may not be assigned to a user until another user (or the same user) has indicated the "provide initial training" task has been completed. These work order tasks may be repeatable for each new employee.

A work order may include four different types of tasks that may be sent to an email client: pre-approval tasks, post-approval tasks, and off-board tasks. When a work order is initially created, pre-approval tasks may be queued in the queuing tables. Following approval, post-approval tasks may be queued in the queuing tables. Off-board tasks may be queued if and when a user closes or cancels a work order.

Other fields of information may be presented for the task of interface 300. For example, a description of the ERP task, comments on the ERP task, a form of execution type (e.g., mandatory or optional), an approval type, and comments may be presented to the user as part of interface 300.

While FIG. 3 illustrates an embodiment of an ERP task when viewed by a user logged into ERP software, FIG. 4 illustrates an embodiment of an interface 400 of an email client task list having an integrated ERP task. The illustrated email client task list of FIG. 4 is from MICROSOFT's OUTLOOK. However, it should be understood that task lists present in other email clients or task lists in other pieces of software may similarly be used to present ERP tasks to a user.

ERP task 420 may represent an ERP task that has been retrieved from ERP software. ERP task 420 may represent the same task as the task of interface 300 of FIG. 3. For example, ERP task 420 of FIG. 4 may represent the ERP task as viewed in an email client, while FIG. 3 illustrates the same ERP task as viewed when a user is directly logged into the ERP software. Only certain types of ERP tasks assigned to a user in ERP software may be synchronized with the user's email client. For example, ERP tasks that automatically complete without user intervention may not be synchronized. ERP tasks that are designated as requiring either mandatory or optional action by the user may be synchronized.

As displayed in the email client, ERP task 420 may contain some or all of the information presented about the ERP task when the user is directly logged into the ERP software. ERP task 420 may list the task indicator (in this embodiment, "Order Laptop"), a description of the task type (in this embodiment, "Information Technology"), and whether action on the task is mandatory or optional. Such information may be derived from various fields of the ERP task as stored by the ERP software. For example, the name of the ERP task as presented in the email client task list may be the task indicator, such as task indicator 310 of FIG. 3. A time and/or date by which a task is required to be completed may be displayed.

Further, an indication may be present that alerts the user that the ERP task originates from the ERP software. In this embodiment, the indication "(ERP)" is present in ERP task 420. To indicate the ERP task as completed, the user may check box 430 to indicate that the ERP task is complete. Checking this box may trigger a completed indication to be sent to the ERP software. ERP task 420 may then be removed from the task list of the email client, or may remain displayed but be indicated as completed. In FIG. 4, only one ERP task is illustrated. This is for example purposes only; it should be understood that more ERP tasks assigned to the user may be presented via the user's email client.

In addition to presenting ERP tasks, such as ERP task 420, the task list of the email client may display one or more other tasks. Email client task 410 represents a task created by a user outside of the ERP software. For example, the user of the email client may have used the email client to create email client task 410 to remind himself to perform an action. This task may not be synchronized with the ERP software. As such, if the user logs in directly to the ERP software, email client task 410 may not be present.

Email client tasks and ERP tasks may be integrated into the same task list of the email client. As such, a user may check each type of task as completed within the same email client task list. However, only tasks that are ERP tasks may be synchronized with the ERP server. The ordering of the tasks, whether ERP tasks or email client tasks, may be based on factors such as date and priority. While two types of tasks are illustrated in FIG. 4, it should be understood that other forms of tasks may be synchronized with external software other than ERP software.

FIG. 5 illustrates another embodiment of an interface 500 presenting a task within ERP software. In using an email client, such as MICROSOFT's OUTLOOK, a user may be permitted to delete a task present on the email client's task list. Deleting an ERP task may or may not be permitted by the user in the ERP software. As such, while the user may delete the ERP task from the task list of the user's email client, the ERP task may remain undeleted in the ERP software, but may be designated as "deleted in the email client." Referring to interface 500, check boxes 510 may be used to indicate whether a task has been deleted in the user's email client. If a user deletes an ERP task in the user's email client, this may trigger a check box of check boxes 510 to be checked. Of course, other forms of indicators besides checkboxes may be used. Further, the ERP task may be designated a particular status. For example, deleting an ERP task in an email client may be treated as the functional equivalent of the user completing the ERP task. As such, if a user deletes an ERP task in the user's email client, the ERP task in the ERP software may be designated as "deleted in the email client" and also designated as completed. In other embodiments, deletion may be associated with a different action. If a task has been deleted in the email client, the user may still be able to modify the task when directly logged into the ERP software.

Once a task has been fully executed (e.g., designated completed, assigned to another user) by the user in the ERP software, it may not be permitted for the user to further modify the task. However, the email client may permit further modification of the same task. If the user modifies the ERP that has been fully executed by the user, no changes may occur to the ERP task at the ERP software and a notification may be sent to the user stating as such.

Task status indicator 520 illustrates various task statuses that may be set by a user for a particular task. In the illustrated embodiment of interface 500, an ERP task may be designated as: not started, completed, deferred, in progress, or "waiting on someone else." The same ERP task presented to the user via an email client may only permit one of two task statuses: not started (unchecked) or completed (checked). In some embodiments, the user may be permitted to specify other statuses via the email client.

Figure 6:
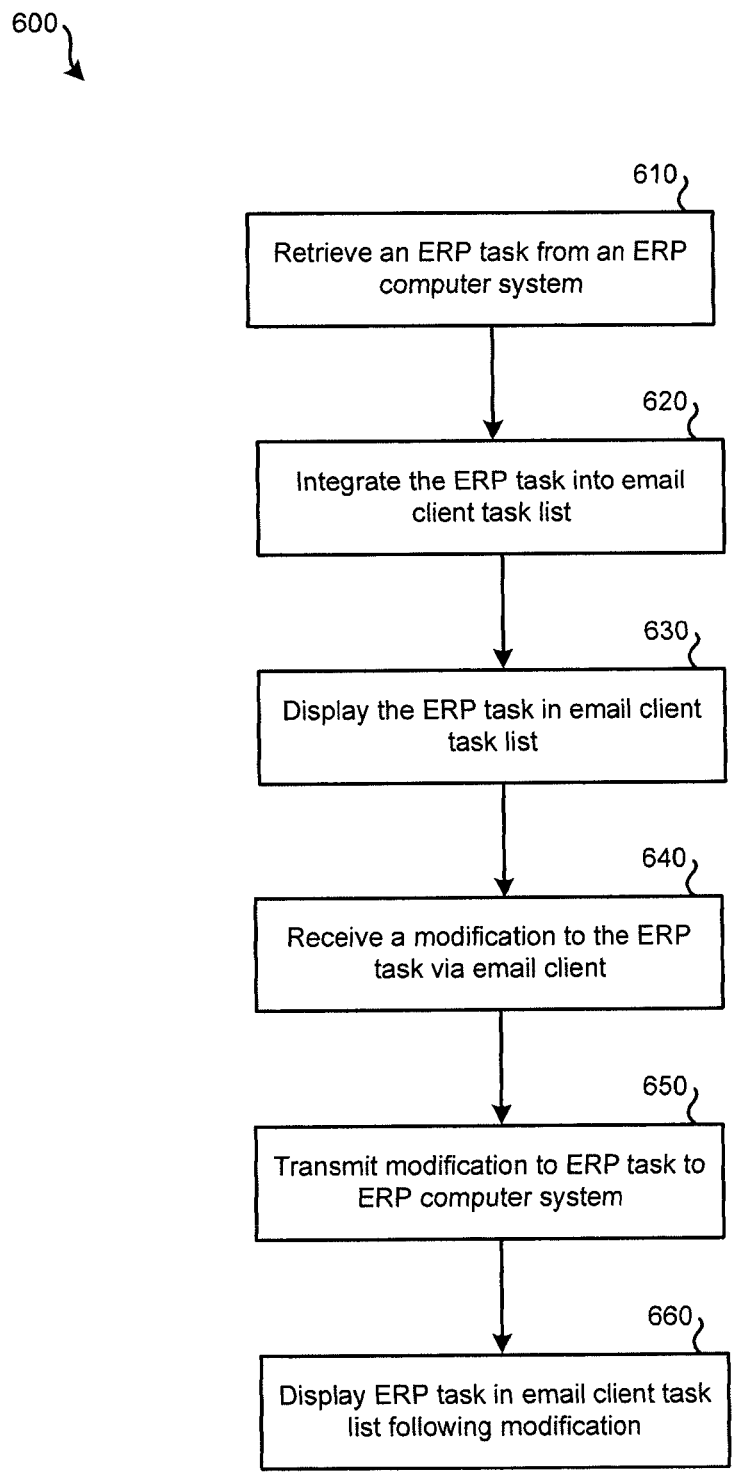
FIG. 6 illustrates an embodiment of a method for handling ERP tasks external from ERP software via an email client.

The various systems and interfaces of FIGS. 1-5 may be used to perform methods for handling ERP tasks external from ERP software via an email client. FIG. 6 illustrates an embodiment of a method 600 for handling ERP tasks external from ERP software via an email client. Method 600 may be performed by system 100 and/or system 200 of FIGS. 1 and 2, respectively. Method 600 may also be performed by some other system for handling ERP tasks external from ERP software via an email client. Each step of method 600 may be performed by a user computer system that is executing an email client. More specifically, referring to FIG. 1, a user computer system of user computer systems 120 that is executing an email client of email clients 122 may perform the steps of method 600.

At step 610, an email client may retrieve an ERP task linked with a user from an ERP computer system. One or more ERP tasks may be retrieved from the ERP computer system. Referring to FIG. 1, for example, email client 122-1 being executed by user computer system 120-1 may retrieve an ERP task associated with a particular user from ERP software 112 that is being executed by ERP computer system 110. Referring to FIG. 2, retrieval of the ERP task linked with the user may involve an ERP task residing in one or more queuing tables 240 that is linked with the appropriate user being retrieved by email client 122-2. The email client retrieving the ERP task may include an ERP plug-in. A user may trigger the email client to attempt to retrieve ERP tasks. In some embodiments, the email client may be configured to periodically poll the ERP computer system to determine if any new tasks have been assigned to the user or tasks already assigned to the user have been modified.

At step 620, the ERP task retrieved at step 610 may be integrated into the task list of the user's email client. Such integration may involve information linked with the ERP task by the ERP software being displayed as part of the task in the task list of the email client. For example, referring to FIG. 3, various details regarding an ERP task are broken out into data fields. Some or all of such information may be incorporated into the entry of the ERP task in the email client task list. For example, rather than just the task descriptor of the ERP task being presented in the email client task list, the task indicator, approval type, description, execution type, and/or other information about the task may be listed. Additionally, an indicator that notifies the user that the task is an ERP task may be present.

At step 630, the ERP task may be displayed in the email client task list. The ERP task may be displayed among other tasks that are created locally via the email client or via some other external software program. As such, ERP tasks may be interspersed with other tasks that may or may not be ERP tasks.

At step 640, a modification to the ERP task may be received from the user via the email client. A modification may involve changing the status of the ERP task. For example, by checking off the ERP task, the user may modify the ERP task from being "not completed" to "completed." Other forms of modification involve actions such as: editing a task, reassigning a task, providing a completion percentage, or deleting a task.

At step 650, the modification performed by the user to the ERP task may be synchronized with the ERP software being executed by the ERP computer system. To do this, an indication of the modification may be transmitted to the ERP computer system. As an example, if the user indicated that the ERP task is complete, an indication that the ERP task is complete may be transmitted to the ERP software running on the ERP computer system.

At step 660, the ERP, as modified, may be displayed to the user via the email client task list. For example, if the user indicated that the ERP task is complete, the ERP task may be checked off as completed or have a line through it. If the user directly logs into the ERP software, the task may be synchronized such that it is similarly indicated as completed.

While method 600 details a user using an email client to modify an ERP task, the user may still be permitted to log directly in to the ERP software and modify ERP tasks. If the user does so, the ERP task modified may be updated in the user's email client. As such, regardless if the user modifies the ERP task using the email client or the ERP software, the status of the tasks remains synchronized.

Figure 7:
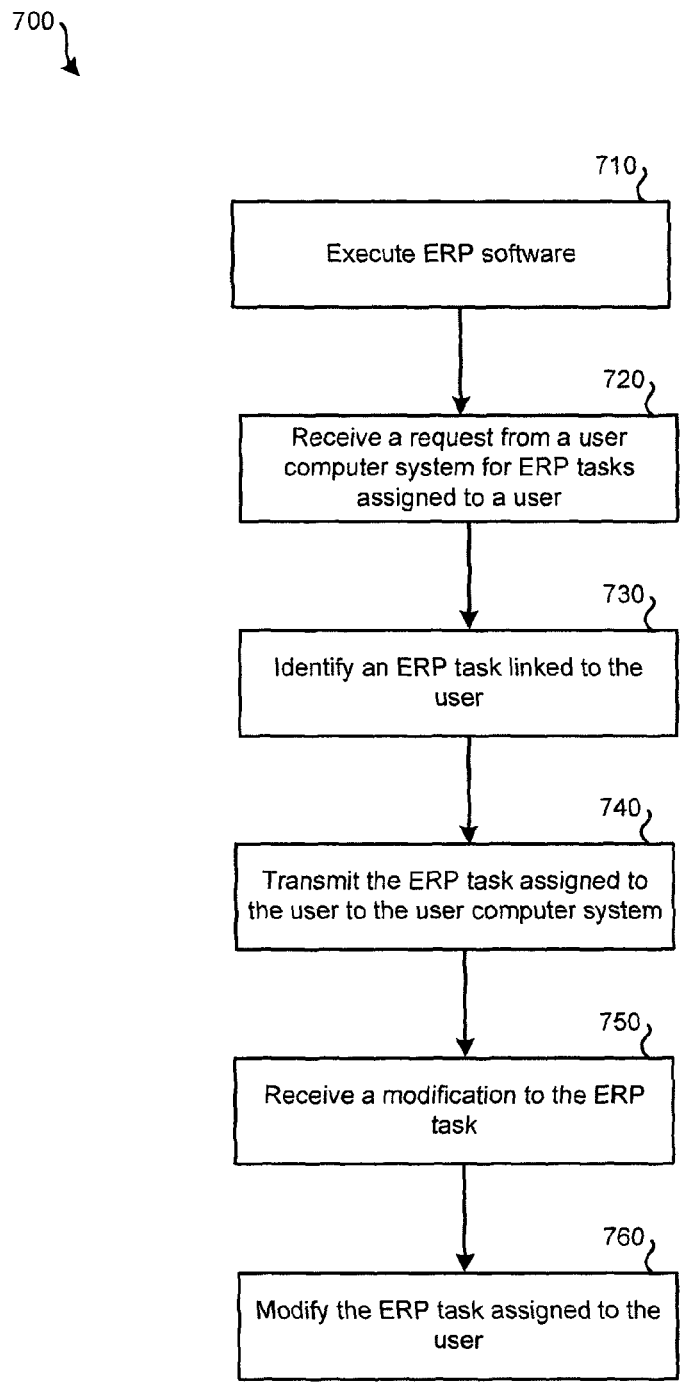
FIG. 7 illustrates an embodiment of a method for handling ERP tasks by the ERP software externally.

FIG. 7 illustrates an embodiment of a method for handling ERP tasks by the ERP software externally. Method 700 may be performed by system 100 and/or system 200 of FIGS. 1 and 2, respectively. Method 700 may also be performed by some other system for handling ERP tasks externally from ERP software. Each step of method 700 may be performed by an ERP computer system. More specifically, referring to FIG. 1, ERP computer system 110 may perform the steps of method 700.

At step 710, the ERP computer system may execute the ERP software. Therefore, the ERP software may be accessible to one or more users. At step 720, a request from a user computer system for ERP assigned to the user may be received. This request may have been generated by an email client being executed by the user computer system. The request may specify the user. The request may have been triggered by the user via the email client or the email client may automatically pull new and/or updated ERP tasks periodically from the ERP software.

At step 730, an ERP task assigned to the user is identified. It should be understood that the number of ERP tasks identified may be more than one. For example, if four ERP tasks are assigned to a user, four ERP tasks may be identified. If no ERP tasks are identified, method 700 may skip to step 750. To identify an ERP task assigned to the user, queuing tables, such as queuing tables 240 of FIG. 2, may be searched for ERP tasks assigned to the user. At step 740, the ERP tasks assigned to the user may be transmitted to an email client of the user computer system.

At step 750, a modification to the ERP task may be received from the email client of the user computer system. A modification may involve changing the status of the ERP task. For example, by checking off the ERP task, the user may modify the ERP task from being "not completed" to "completed." Other forms of modification involve actions such as: editing a task, reassigning a task, providing a completion percentage, or deleting a task. The user may have provided the modification to the email client executing on the user computer system. The email client, possibly in conjunction with an email plug-in, may transmit an indication of the ERP task and the modification to the ERP software being executed by the ERP computer system.

At step 760, the ERP task may be modified at the ERP computer system in accordance with the modification received from the user computer system. As such, the ERP task at the ERP computer system and the email client of the user computer system remain synchronized. If the ERP task was identified as completed at the email client of the user computer system, the ERP task may be modified at the ERP computer system to be indicated as complete. Further modification of the ERP at the ERP computer system may then be prohibited.

Figure 8A:
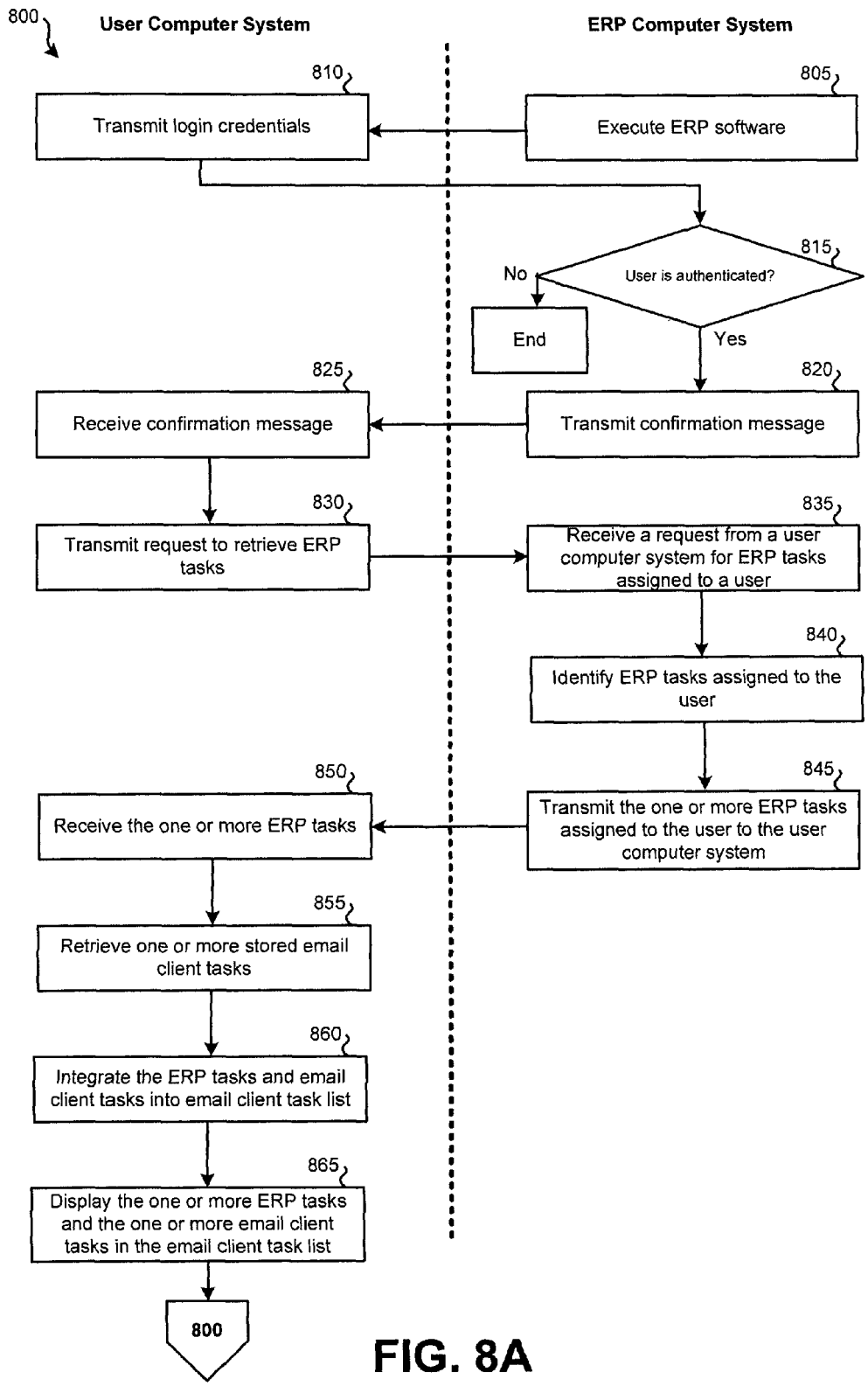
FIGS. 8A and 8B illustrate another embodiment of a method for handling ERP tasks external from ERP software.
Figure 8B:
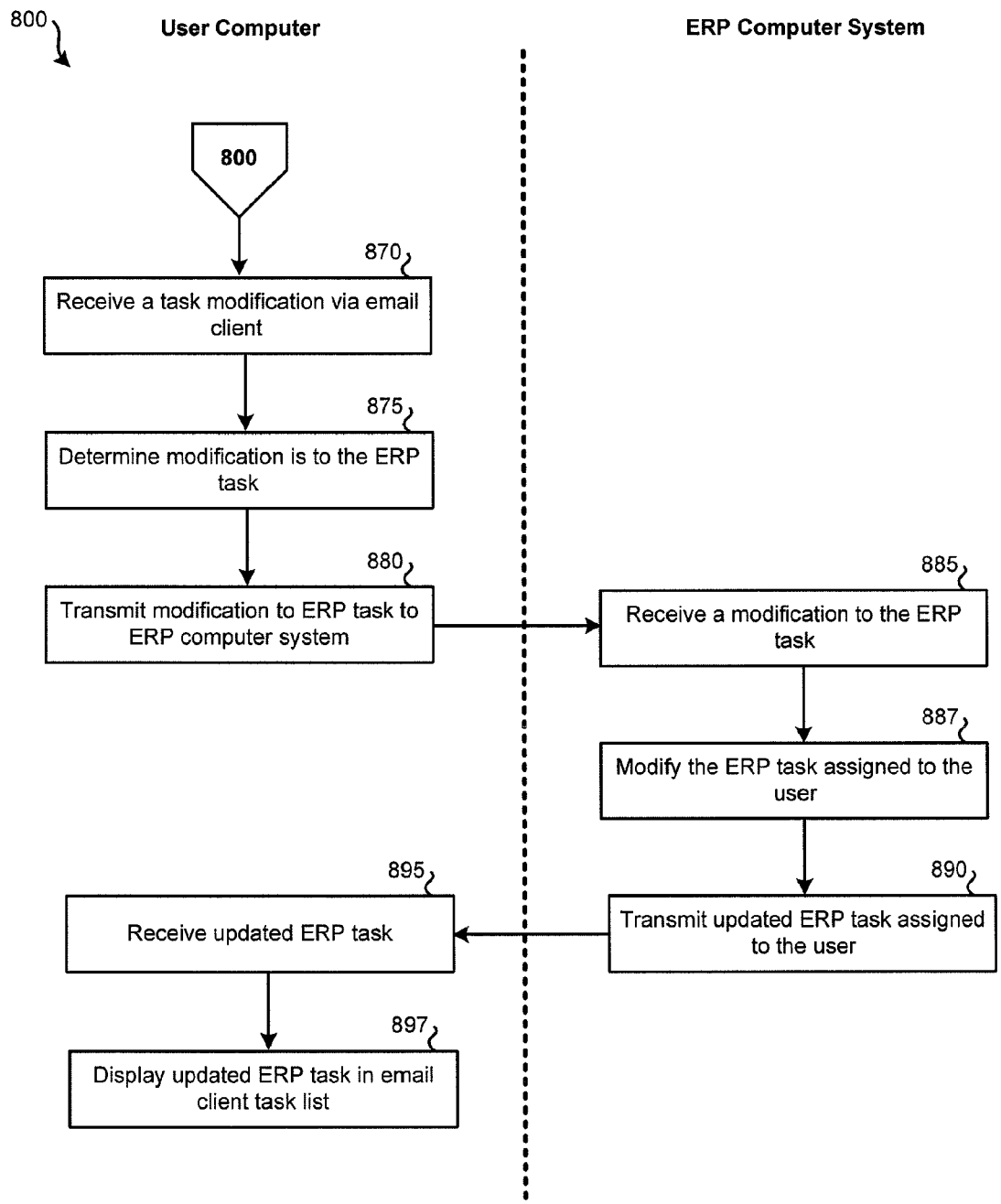

FIGS. 8A and 8B illustrate another embodiment of a method 800 for handling ERP tasks external from ERP software. Method 800 may be performed by system 100 and/or system 200 of FIGS. 1 and 2, respectively. Method 800 may also be performed by some other system for handling ERP tasks externally from ERP software. Steps of method 800 designated as completed by the user computer system may be completed by a user computer system of user computer systems 120 of FIG. 1. Steps of method 800 designated as completed by the ERP computer system may be completed by ERP computer system 110 of FIG. 1.

At step 805 of FIG. 8A, the ERP computer system may execute the ERP software. Therefore, the ERP software may be remotely accessible to one or more users, either by the users directly logging in to the ERP software or via an email client.

At step 810, an email client being executed by the user computer system may transmit login credentials to the ERP computer system. The login credentials may include a username and a password for the user of the user computer system. The username and/or password may be stored by the email client. In some embodiments, the user may be required to provide the username and password when the email client attempts to synchronize ERP tasks. If the username and/or password of the user is stored, the user may only have been required to provide the username and/or password once when initially configuring the ERP plug-in of the email client.

At step 815, the user credentials received from the user computer system are authenticated. This may involve the ERP computer system comparing the username and password to a database of usernames and corresponding passwords. If the username and password combination is valid, method 800 may proceed to step 820. If the username and password combination is not valid, method 800 may end.

At step 820, a confirmation message stating that authentication has been successful may be transmitted by the ERP computer system to the user computer system. In some embodiments, rather than transmitting a confirmation message, method 800 may proceed directly to step 845 and transmit ERP tasks assigned to the user to the user computer system. At step 825, the confirmation message acknowledging authentication of the user may be received by the user computer system. At step 830, a request to retrieve ERP tasks assigned to the user linked with the username and password authenticated may be transmitted. In some embodiments, the request to retrieve ERP tasks assigned to the user is part of the transmission of the login credentials.

At step 835, the request for the ERP tasks assigned to the user may be received by the ERP computer system. In some embodiments, the request may be received by a web service, such as web service 250 of FIG. 2. At step 840, one or more ERP tasks assigned to the user may be identified by the ERP computer system. If no ERP tasks assigned to the user are identified, the user computer system may be notified that no ERP tasks assigned to the user are present. The ERP tasks assigned to the user may be retrieved from one or more queuing tables, such as queuing tables 240 of FIG. 2. At step 845, an indication of the ERP tasks assigned to the user is transmitted by the ERP computer system to the user computer system. This may involve various information regarding each ERP task assigned to the user being transmitted to the user computer system, such as the name of the ERP task, a deadline for the ERP task, a description for the ERP task, and/or a current state of the ERP task. At step 850, the one or more ERP tasks may be received by the user computer system.

At step 855, one or more stored email client tasks may be retrieved. Each email client task may be a task that was created using the email client by the user. As such, these tasks may be unrelated to the ERP software and may not be synchronized with the ERP computer system. Accordingly, changes made by a user to email client tasks may only be made locally (or at a separate email server), but changes to an ERP task may be synchronized with the ERP computer system. If the user has not created any email client tasks, no stored email client tasks may be retrieved at step 855.

At step 860, the one or more ERP tasks and the one or more email client tasks may be integrated into a single email client task list. The ERP tasks and email client tasks may be interspersed within the email client task list such that all tasks are ordered in the single email client task list according to a characteristic of the tasks, such as the deadline for completion, creation date, alphabetical order, or importance of the task. Integrating ERP tasks into the email client task list may involve the email client creating tasks that are based on information present in the one or more ERP tasks received at step 850. ERP tasks may be labeled such that the user is aware that the ERP tasks originate from an ERP server. For example, following each ERP task, an indication of "(ERP)" may be present. In some embodiments, no separate identifier is present to alert the user which tasks are ERP tasks and which are email client tasks. At step 865, the email client task list that contains one or more ERP tasks and one or more email client tasks is presented to the user via the user computer system.

Method 800 continues on FIG. 8B. At step 870, a modification to a task may be received from the user via the email client of the user computer system. A modification may involve changing the status of the task. For example, by checking off the task, the user may modify the task from being "not completed" to "completed." Other forms of modification involve actions such as: editing a task, reassigning a task, providing a completion percentage, or deleting a task.

At step 875, it may be determined whether the task is an ERP task or an email client task. If the task is identified as an ERP task, the ERP computer system may be required to be informed of the modification. As such, method 800 may proceed to step 880. If the modification is to an email client task, no remote computer system may be notified of the change (or another remote computer is notified, as an email server). Step 875 may involve checking all ERP tasks present in the email client task list to indentify all ERP tasks that have been modified via the email client. Each ERP task that has been modified may be synchronized to the (queuing tables of) the ERP software at the ERP computer system.

If the modification is to an ERP task, at step 880, the modification performed by the user to the ERP task may be synchronized with the ERP software being executed by the ERP computer system. To do this, an indication of the modification may be transmitted to the ERP computer system. As an example, if the user indicated that the ERP task is complete, an indication that the ERP task is complete may be transmitted to the ERP software running on the ERP computer system.

At step 885, a modification to the ERP task may be received from the email client of the user computer system. A modification may involve changing the status of the ERP task. For example, by checking off the ERP task, the user may modify the ERP task from being "not completed" to "completed." At step 887, the ERP task may be modified at the ERP computer system in accordance with the modification received from the user computer system.

At step 890, the ERP task, as updated in response to the modification, may be transmitted to the user computer system; for example, if the modification indicated that the ERP task is complete. The updated ERP task transmitted to the user computer system may be designated completed. At step 895, the updated ERP task may be received by the user computer system. At step 897, the updated ERP task may be displayed in the email client task list to the user. As understood by those with skill in the art, displaying involves the use of associated hardware, including a display screen, such as an LCD or CRT monitor.

While the described embodiment of method 800 details a modification being applied to an ERP task through an email client executed on a user computer system, it should be understood that other embodiments are possible. For example, the user may be permitted to directly log in to the ERP software of the ERP computer system. The user may make the same or a similar modification to the ERP task directly through the ERP software. The modification to the ERP task may then be retrieved by the email client executed on the user computer system, such that the ERP tasks in the email client task list and the ERP tasks at the ERP software of the ERP computer system remain synchronized.

Figure 9:
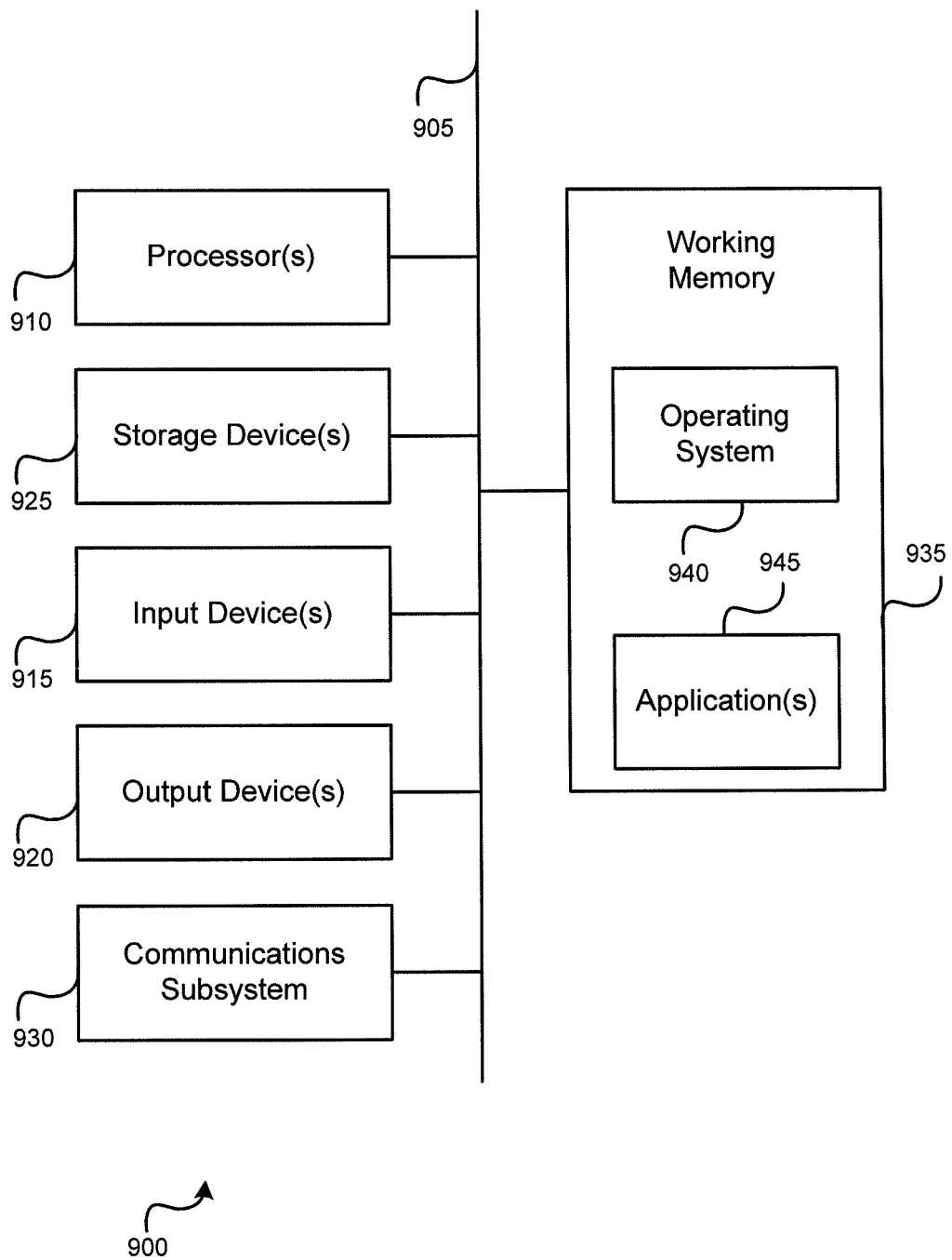
FIG. 9 illustrates an embodiment of a computer system.

A computer system as illustrated in FIG. 9 may be incorporated as part of the previously described computerized devices. For example, computer system 900 can represent any of the user computer systems and/or the ERP computer system of FIG. 1. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system for integrating tasks, the system comprising:
   a task management computer system comprising one or more first processors and a first memory, the first memory having stored thereon first instructions that, when executed by the one or more first processors, cause the one or more first processors to perform first actions including:
      receiving one or more first communications that indicate that a work order is created;
      identifying a plurality of work-order tasks, each task of the plurality of work-order tasks corresponding to the work order;
      determining one or more first work-order tasks of the plurality of work-order tasks that correspond to the work order is to be assigned to a first user;
      storing, in a queuing table, each first work-order task of the one or more first work-order tasks in association with an indication that the first work-order task is assigned to the first user of a plurality of users;
      receiving, from a first user computer system, a request to pull task data and that includes an identifier of the first user;
      performing a first search of the queuing table using the identifier of the first user;
      transmitting, to the first user computer system, a second communication that includes the one or more first work-order tasks, each of the one or more first work-order tasks having been identified in a first result of the first search;
      receiving, from the first user computer system, a third communication that includes a modification to a first work-order task of the one or more first work-order tasks;
      in response to the third communication:
         determining one or more second work-order tasks of the plurality of work-order tasks that correspond to the work order is to be assigned to a second user;
         storing, in the queuing table, each second work-order task of the one or more second work-order tasks in association with an indication that the second work-order task is assigned to the second user of the plurality of users, and wherein the modified first work-order task and each of the one or more second work-order tasks are distinct tasks to be completed; and
         transmitting, to a second user computer system, a fourth communication that includes the one or more second work-order tasks having been stored at the queuing table;
   the first user computer system comprising one or more second processors and a second memory, the second memory having stored thereon second instructions that, when executed by the one or more second processors, cause the one or more second processors to perform second actions including:
  generating, via execution of a first email client application at the first user computer system, the request to pull task data and that includes the identifier of the first user;
  transmitting, to the task management computer system, the request to pull task data and that includes the identifier of the first user;
  receiving, from the task management computer system, the second communication that includes the one or more first work-order tasks having been identified in the first result of the first search of the queuing table performed at the task management computer system;
  accessing one or more first email client tasks, each of the one or more first email client tasks having been created locally at the first user computer system and stored using the first email client application, wherein each of the one or more first email client tasks is accessible via the first email client application but is not accessible to the task management computer system;
  integrating, via execution of the first email client application, the one or more first work-order tasks with the one or more first email client tasks to generate a first integrated task list, the integrating including interspersing the one or more first work-order tasks within the one or more first email client tasks;
  causing the first integrated task list to be displayed such that the one or more first email client tasks are presented concurrently with the one or more first work-order tasks, the causing of the first integrated task list to be displayed occurring via the first email client application being executed by the first user computer system;
  detecting an input corresponding to the modification to the first work-order task; and
  transmitting, to the task management computer system, the third communication that includes the modification to the first work-order task; and
the second user computer system comprising one or more third processors and a third memory, the third memory having stored thereon third instructions that, when executed by the one or more third processors, cause the one or more third processors to perform third actions including:
  receiving, from the task management computer system, the fourth communication that includes the one or more second work-order tasks having been stored at the queuing table;
  accessing one or more second email client tasks, each of the one or more second email client tasks having been created locally at the second user computer system using a second email client application, and each of the one or more second email client tasks being accessible via the second email client application but not being accessible to the task management computer system;
  integrating, via execution of a second email client application at the second user computer system, the one or more second work-order tasks with the one or more second email client tasks to generate a second integrated task list, the integrating including interspersing the one or more second work-order tasks within the one or more second email client tasks; and
  causing the second integrated task list to be displayed such that the one or more second work-order tasks are presented concurrently with the one or more second email client tasks.

2. The system for integrating tasks of claim 1, wherein the:
  first work-order task includes a change of a status of the first work-order task.

3. The system for integrating tasks of claim 1, wherein the first actions further include:
  changing a status of the first work-order task in the queuing table in response to the third communication that includes the modification to the first work-order task.

4. The system for integrating tasks of claim 3, wherein modifying the status of the first work-order task comprises designating the first work-order task as completed.

5. The system for integrating tasks of claim 1, wherein:
  the first instructions are further configured to require login credentials from each user of the plurality of users to permit access to the task management computer system; and
  the second actions further include causing login credentials of the first user to be transmitted to the task management computer system prior to receiving the second communication that includes the one or more first work-order tasks from the task management computer system.

6. The system for integrating tasks of claim 1, wherein each of the one or more first work-order tasks and each of the one or more second work-order tasks is a user-performed activity required to be completed by a point in time.

7. The system for integrating tasks of claim 1, wherein the first user and the second user are different users, and wherein the first user computer system and the second user computer system are different computer systems.

8. The system for integrating tasks of claim 1, wherein the one or more first work-order tasks are interspersed within the one or more first email client tasks based on a characteristic, such that tasks within the first integrated task list are identified in an order corresponding to the characteristic.

9. The system for integrating tasks of claim 1, wherein the one or more first work-order tasks are interspersed within the one or more first email client tasks such that tasks within the first integrated task list are ordered according to deadlines of the tasks, the deadlines corresponding to deadlines for completion, creation dates, name, or importance.

10. A method for integrating tasks, the method comprising:
  receiving, at a task management computer system, one or more first communications that indicate that a work order is created;
  identifying, at the task management computer system, a plurality of work-order tasks, each task of the plurality of work-order tasks corresponding to the work order;
  determining, at the task management computer system, one or more first work-order tasks of the plurality of work-order tasks that correspond to the work order is to be assigned to a first user of a plurality of users;
  storing, in a queuing table, each first work-order task of the one or more first work-order tasks in association with an indication that the first work-order task is assigned to the first user;
  receiving, from a first user computer system, a request to pull task data and that includes an identifier of the first user;

performing, at the task management computer system, a first search of the queuing table using the identifier of the first user;

transmitting, to the first user computer system, a second communication that includes the one or more first work-order tasks, each of the one or more first work-order tasks having been identified in a first result of the first search;

receiving, from the first user computer system, a third communication that includes a modification to a first work-order task of the one or more first work-order tasks;

in response to the third communication:
  determining one or more second work-order tasks of the plurality of work-order tasks that correspond to the work order is to be assigned to a second user;
  storing, in the queuing table, each second work-order task of the one or more second work-order tasks in association with an indication that the second work-order task is assigned to the second user of the plurality of users, and wherein the modified first work-order task and each of the one or more second work-order tasks are distinct tasks to be completed;
  transmitting, to a second user computer system, a fourth communication that includes the one or more second work-order tasks having been stored at the queuing table;

generating, via execution of a first email client application at the first user computer system, the request to pull task data and that includes the identifier of the first user;

transmitting, to the task management computer system, the request to pull task data and that includes the identifier of the first user;

receiving, from the task management computer system and at the first user computer system, the second communication that includes the one or more first work-order tasks having been identified in the first result of the first search of the queuing table performed at the task management computer system;

accessing, at the first user computer system, each of one or more first email client tasks having been created locally at the first user computer system and stored using the first email client application, wherein each of the one or more first email client tasks is accessible via the first email client application but is not accessible to the task management computer system;

integrating, via execution of the first email client application at the first user computer system, the one or more first work-order tasks with the one or more first email client tasks to generate a first integrated task list, the integrating including interspersing the one or more first work-order tasks within the one or more first email client tasks;

causing, the first integrated task list to be displayed at the first user computer system such that the one or more first email client tasks are presented concurrently with the one or more first work-order tasks, the causing of the first integrated task list to be displayed occurring via the first email client application being executed by the first user computer system;

detecting, at the first user computer system, an input corresponding to the modification to the first work-order task;

transmitting, from the first user computer system and to the task management computer system, the third communication that includes the modification to the first work-order task;

receiving, at a second user computer system and from the task management computer system, the fourth communication that includes the one or more second work-order tasks having been stored at the queuing table;

accessing, at the second user computer system, one or more second email client tasks, each of the one or more second email client tasks having been created locally at the second user computer system using a second email client application, and each of the one or more second email client tasks being accessible via the second email client application but not being accessible to the task management computer system;

integrating, via execution of a second client email application at the second user computer system, the one or more second work-order tasks with the one or more second email client tasks to generate a second integrated task list, the integrating including interspersing the one or more second work-order tasks within the one or more second email client tasks; and causing the second integrated task list to be displayed at the second user computer system such that the one or more second work-order tasks are presented concurrently with the one or more second email client tasks.

11. The method for integrating tasks of claim 10, further comprising:
  changing a status of the first work-order task in the queuing table in response to the third communication that includes the modification to a first work-order task, wherein modifying the status of the first work-order task comprises designating the first work-order task as completed.

12. The method for integrating tasks of claim 10, the method further comprising:
  causing, at the first user computer system, login credentials of the first user to be transmitted to the task management computer system prior to receiving the second communication that includes the one or more first work-order tasks from the task management computer system.

13. The method for integrating tasks claim 10, wherein first work-order task of the one or more first work-order tasks identifies a user-performed activity to be completed by a point in time.

14. A computer program product residing on a non-transitory processor-readable medium and comprising processor-readable instructions configured to cause one or more processors to perform first actions including:
  receiving, at a task management computer system, one or more first communications that indicate that a work order is created;
  identifying, at the task management computer system, a plurality of work-order tasks, each task of the plurality of work-order tasks corresponding to the work order;
  determining, at the task management computer system, one or more first work-order tasks of the plurality of work-order tasks that correspond to the work order is to be assigned to a first user of a plurality of users;
  storing, in a queuing table, each first work-order task of the one or more first work-order tasks in association with an indication that the first work-order task is assigned to the first user;
  receiving, from a first user computer system, a request to pull task data and that includes an identifier of the first user;
  performing, at the task management computer system, a first search of the queuing table using the identifier of the first user;

transmitting, to the first user computer system, a second communication that includes the one or more first work-order tasks, each of the one or more first work-order tasks having been identified in a first result of the first search;

receiving, from the first user computer system, a third communication that includes a modification to a first work-order task of the one or more first work-order tasks;

in response to the third communication:
   determining one or more second work-order tasks of the plurality of work-order tasks that correspond to the work order is to be assigned to a second user;
   storing, in the queuing table, each second work-order task of the one or more second work-order tasks in association with an indication that the second work-order task is assigned to the second user of the plurality of users, and wherein the modified first work-order task and each of the one or more second work-order tasks are distinct tasks to be completed;
   transmitting, to a second user computer system, a fourth communication that includes the one or more second work-order tasks having been stored at the queuing table;

wherein the first user computer system is configured to transmit, to the task management computer system, the third communication that includes the modification to the first work-order task in response to performing second actions at the first user computer system including:
   generating, via execution of a first email client application at the first user computer system, the request to pull task data and that includes the identifier of the first user;
   transmitting, to the task management computer system, the request to pull task data and that includes the identifier of the first user;
   receiving, from the task management computer system, the second communication that includes the one or more first work-order tasks having been identified in the first result of the first search of the queuing table performed at the task management computer system;
   accessing each of one or more first email client tasks having been created locally at the first user computer system and stored using the first email client application, wherein each of the one or more first email client tasks is accessible via the first email client application but is not accessible to the task management computer system;
   integrating, via execution of the first email client application, the one or more first work-order tasks with the one or more first email client tasks to generate a first integrated task list, the integrating including interspersing the one or more first work-order tasks within the one or more first email client tasks;
   causing the first integrated task list to be displayed at the first user computer system such that the one or more first email client tasks are presented concurrently with the one or more first work-order tasks, the causing of the first integrated task list to be displayed occurring via the first email client application being executed by the first user computer system; and
   detecting an input corresponding to the modification to the first work-order task;

wherein the second user computer system is configured to respond to receipt of the fourth communication by performing third actions at the second user computer system including:
   accessing one or more second email client tasks, each of the one or more second email client tasks having been created locally at the second user computer system using a second email client application, and each of the one or more second email client tasks being accessible via the second email client application but not being accessible to the task management computer system;
   integrating, via execution of a second client email application at the second user computer system, the one or more second work-order tasks with the one or more second email client tasks to generate a second integrated task list, the integrating including interspersing the one or more second work-order tasks within the one or more second email client tasks; and
   causing the second integrated task list to be displayed at the second user computer system such that the one or more second work-order tasks are presented concurrently with the one or more second email client tasks.

15. The computer program product of claim 14, wherein the first actions further include changing a status of the first work-order task in the queuing table in response to the third communication that includes the modification to a first work-order task, and wherein modifying the status of the first work-order task further comprises designating the first work-order task as completed.

16. The computer program product of claim 14, wherein the first actions further include
   causing login credentials of the first user to be transmitted to the task management computer system prior to receiving the second communication that includes the one or more first work-order tasks from the task management computer system.

17. The computer program product of claim 14, wherein first work-order task of the one or more first work-order tasks identifies a user-performed activity to be completed by a point in time.

18. A system for integrating tasks, the system comprising:
   one or more processors; and
   a memory communicatively coupled with and readable by the one or more processors and having stored therein processor-readable instructions which, when executed by the one or more processors, cause the one or more processors to perform first actions including:
      receiving, at a task management computer system, one or more first communications that indicate that a work order is created;
      identifying, at the task management computer system, a plurality of work-order tasks, each task of the plurality of work-order tasks corresponding to the work order;
      determining, at the task management computer system, one or more first work-order tasks of the plurality of work-order tasks that correspond to the work order is to be assigned to a first user;
      storing, in a queuing table, each first work-order task of the one or more first work-order tasks in association with an indication that the first work-order task is assigned to the first user;
      receiving, from a first user computer system, a request to pull task data and that includes an identifier of the first user;

performing, at the task management computer system, a first search of the queuing table using the identifier of the first user of a plurality of users;

transmitting, to the first user computer system, a second communication that includes the one or more first work-order tasks, each of the one or more first work-order tasks having been identified in a first result of the first search;

receiving, from the first user computer system, a third communication that includes a modification to a first work-order task of the one or more first work-order tasks;

in response to the third communication:
  determining one or more second work-order tasks of the plurality of work-order tasks that correspond to the work order is to be assigned to a second user;
  storing, in the queuing table, each second work-order task of the one or more second work-order tasks in association with an indication that the second work-order task is assigned to the second user of the plurality of users, and wherein the modified first work-order task and each of the one or more second work-order tasks are distinct tasks to be completed;
  transmitting, to a second user computer system, a fourth communication that includes the one or more second work-order tasks having been stored at the queuing table;

wherein the first user computer system is configured to transmit, to the task management computer system, the third communication that includes the modification to the first work-order task in response to performing second actions at the first user computer system including:
  generating, via execution of a first email client application at the first user computer system, the request to pull task data and that includes the identifier of the first user;
  transmitting, to the task management computer system, the request to pull task data and that includes the identifier of the first user;
  receiving, from the task management computer system, the second communication that includes the one or more first work-order tasks having been identified in the first result of the first search of the queuing table performed at the task management computer system;
  accessing each of one or more first email client tasks having been created locally at the first user computer system and stored using the first email client application, wherein each of the one or more first email client tasks is accessible via the first email client application but is not accessible to the task management computer system;
  integrating, via execution of the first email client application, the one or more first work-order tasks with the one or more first email client tasks to generate a first integrated task list, the integrating including interspersing the one or more first work-order tasks within the one or more first email client tasks;
  causing the first integrated task list to be displayed at the first user computer system such that the one or more first email client tasks are presented concurrently with the one or more first work-order tasks, the causing of the first integrated task list to be displayed occurring via the first email client application being executed by the first user computer system; and
  detecting an input corresponding to the modification to the first work-order task;

wherein the second user computer system is configured to respond to receipt of the fourth communication by performing third actions at the second user computer system including:
  accessing one or more second email client tasks, each of the one or more second email client tasks having been created locally at the second user computer system using a second email client application, and each of the one or more second email client tasks being accessible via the second email client application but not being accessible to the task management computer system;
  integrating, via execution of a second client email application at the second user computer system, the one or more second work-order tasks with the one or more second email client tasks to generate a second integrated task list, the integrating including interspersing the one or more second work-order tasks within the one or more second email client tasks; and
  causing the second integrated task list to be displayed at the second user computer system such that the one or more second work-order tasks are presented concurrently with the one or more second email client tasks.

* * * * *

UNITED STATES PATENT AND TRADEMARK OFFICE
CERTIFICATE OF CORRECTION

PATENT NO. : 9,911,089 B2
APPLICATION NO. : 13/234389
DATED : March 6, 2018
INVENTOR(S) : Saiu et al.

Page 1 of 1

It is certified that error appears in the above-identified patent and that said Letters Patent is hereby corrected as shown below:

In the Drawings

On sheet 5 of 10, in FIG. 5, Line 17, delete "Managemeng" and insert -- Management --, therefor.

In the Specification

In Column 12, Line 39, delete "indentify" and insert -- identify --, therefor.

In the Claims

In Column 20, Line 40, in Claim 13, after "tasks" insert -- of --, therefor.

Signed and Sealed this
Fourteenth Day of August, 2018

Andrei Iancu
*Director of the United States Patent and Trademark Office*